United States Patent [19]

Trani et al.

[11] Patent Number: 5,293,540
[45] Date of Patent: Mar. 8, 1994

[54] METHOD AND APPARATUS FOR MERGING INDEPENDENTLY GENERATED INTERNAL VIDEO WITH EXTERNAL VIDEO

[75] Inventors: Stephen S. Trani; Garth S. Jones, both of Virginia Beach; James S. Love, Hampton; James H. Vogeley, Yorktown, all of Va.

[73] Assignee: nView Corporation, Newport News, Va.

[21] Appl. No.: 736,319

[22] Filed: Jul. 29, 1991

[51] Int. Cl.$^5$ .................... H04N 5/262; H04N 9/74; H04N 3/223
[52] U.S. Cl. .................... 348/584; 348/589; 348/704
[58] Field of Search ............ 358/183, 22, 188, 21 A, 358/160, 180, 241; H04N 5/262, 5/272, 9/74, 3/223

[56] References Cited

U.S. PATENT DOCUMENTS

| | | | |
|---|---|---|---|
| 4,220,965 | 9/1980 | Heitmann et al. | 358/22 |
| 4,266,242 | 5/1981 | McCoy | 358/22 |
| 4,667,221 | 5/1987 | Cawley et al. | 358/183 |
| 4,700,228 | 10/1987 | Heerah | 358/22 |
| 4,722,007 | 1/1988 | Fling | 358/183 |
| 4,725,888 | 2/1988 | Hakamada | 358/183 |
| 4,750,039 | 6/1988 | Willis | 358/183 |
| 4,862,269 | 8/1989 | Sonoda et al. | 358/160 |
| 5,053,863 | 10/1991 | Ohtsuka | 358/21 R |
| 5,124,790 | 6/1992 | Nakayama | 358/160 |

Primary Examiner—James J. Groody
Assistant Examiner—John W. Miller
Attorney, Agent, or Firm—Nixon & Vanderhye

[57] ABSTRACT

Disclosed is a method and apparatus for mixing internally generated or stored video with an external video and driving an LCD display device. External video is clocked into a dual port external frame store. Internal video is either internally generated or read from an internal mass store device and stored in an internal frame store and in a preferred embodiment, the internal video data includes an embedded code which serves to select on a pixel by pixel basis the appropriate frame store signal, either external or internal for display on the LCD panel. By adjusting the start number on row and column counters for reading out data from the external frame store, panning of an external video image can be accomplished. By repeating the readout of the external frame store selectively, a "zoom" of the image can be provided to an LCD display device. By reversing either the direction in which the external video is stored in the frame store or the direction in which columns of information are read out, the displayed image can be reversed permitting rear projection of an accurate image.

21 Claims, 2 Drawing Sheets

Fig. 3

METHOD AND APPARATUS FOR MERGING INDEPENDENTLY GENERATED INTERNAL VIDEO WITH EXTERNAL VIDEO

BACKGROUND OF THE INVENTION

1. Field of the Invention

The present invention relates generally to video data processing techniques and specifically to a unique method and apparatus for merging internal stored or generated video with external video and for processing a resultant video for use in a projection display system.

2. Discussion of Prior Art

The projection of computer generated images through use of liquid crystal display panels is well known in the art. See for example, Vogeley et al, U.S. Pat. No. 4,976,536, issued on Dec. 11, 1990 and U.S. Pat. No. 4,763,993, issued Aug. 16, 1988 and other patents cited therein. It is noted that video input signals can include a wide variety of input formats including VGA, EGA, CGA, Mac II, and a variety of other computer generated video signals, as well as real time motion video signals including NTSC, PAL, SECAM, and that provided by various VCR players are also available.

These videos are clocked at a wide variety of frequencies and are in many different formats. It is sometimes required or desired that these videos be reformatted (double scanned, etc.), as discussed in U.S. patent application Ser. No. 07/664,950, filed Mar. 5, 1991, entitled "Method and Apparatus for Displaying RGB and Sync Video Without Auxiliary Frame Storage Memory", also by Vogeley et al.

In providing video signals for projection, either by projection television techniques or more preferably, by supply to a liquid crystal display (LCD) equipped projector, it is also desirable to provide independently generated video images. In the past, such internally generated images were either merged with the external video source (overwritten) or independently viewed. Such internal video images might be a menu, graphics or an actual video image retrieved from a local mass storage device such as a ROM or disc drive. While not essential, it is desired that the internal video be independent of processing applied to external video signals (panning, reformatting, zooming, etcetera).

Generally LCD displays are clocked at a constant clock frequency which may be dramatically different from the clock frequency of the external video input or even an internally generated signal. Although video is generally projected directly upon a screen, it is also desirable to be able to provide an image reversal or a "mirror image" such that the video can be applied to a rear projection screen for front viewing. As previously noted, depending upon the LCD display chosen, the display clock frequency may vary from 30 hertz vertical frame rate up to 100 hertz or higher.

With regard to external and internal video, it is also desirable to be able to "zoom" or provide a magnified image of a limited portion of the complete video image and then to be able to "pan" the "zoomed" image to that specific portion of the nonzoomed image which was of interest. Although generally image panning is associated with only a zoomed image, it is also desirable to be able to pan a non-zoomed image so as to move a portion of an unzoomed image off of the screen, perhaps making room for a blanked-out portion of the screen suitable for writing in operator control video such as is described in U.S. application Ser. No. 07/698,091, "Method and Apparatus for Interacting With a Computer Generated Projected Image", filed May 10, 1991, also by Vogeley et al.

While the above aspects of a video projection system are desirable, other than by means of a simple overwriting technique which permits user prompts or company logo displays, applicants know of no LCD projection apparatus which can provide a combination of external and internal video (in the manner of "windows" utilized in computer software systems), zooming, panning, or reverse images for external or internal video whether reformatted or not. The advanced capabilities, such as internally generated graphics generation and/or image retrieval, that are entirely independent of a wide variety of incoming video signals, including both computer generated video and real time video, that can be overlayed or merged with incoming video and can be randomly edited has never been previously accomplished to the inventor's knowledge.

SUMMARY OF THE INVENTION

In view of the above limitations of prior art video processing systems, it is an object of the present invention to provide a method and apparatus for permitting the merging of externally and internally generated video such that selected portions of each can be simultaneously displayed.

It is a further object of the present invention to provide a method and apparatus for the capability of "zooming" in order to magnify a portion of an existing video image.

It is a still further object of the present invention to provide a method and apparatus for "panning" vertically and horizontally with respect to an existing video image such that only a portion of that video image is provided on the display.

It is an additional object of the present invention to provide a method and apparatus for providing reverse video to a display which is the mirror image of a conventional display.

It is a further object to provide a method and apparatus to permit graphics generation and/or image retrieval of an internal video signal and the combining with an external video signal to provide a display with selected portions of each video signal with the capability of providing panning, zooming, reformatting, reverse imaging as desired by a controller.

The above and other objects are achieved by the present invention comprising the method of and apparatus for clocking external digital video input to a dual port external frame store. Internally generated digital video is supplied to an internal frame store. The stored videos in both frame stores are stored at addresses corresponding to individual pixels in the output display. Both the external and internal frame stores are clocked to provide external and internal video output to a multiplexer. One of the external or internal digital video includes an additional bit which identifies whether external or internal video is to be elected. The multiplexer upon sensing this additional bit provides the selected external or internal video to the corresponding pixel on the LCD display. Because the external and/or internal frame store is a dual port store, video can be clocked into the storage at one clock rate and can be clocked out at the clock rate of the LCD display device.

In a preferred embodiment, the external and/or internal video is stored in its corresponding frame storage by the utilization of input row and column counters where the column counter can be reversed so that the video is stored essentially backwards. When this video is then read out to the multiplexer (or directly to the display), a "reverse" image is formed. In a further preferred embodiment, the frame storage (external or internal) may be read out by row and column counters in which the column counters are read in reverse order in order to provide the "reversed" image display.

Furthermore, by setting the input and/or output row and column counters at non zero numbers "panning" of the image can be achieved such that the video image at the display starts t a particular row and a particular column. "Zooming" of a particular image or portion of image can be achieved by reading a particular column data bit out twice before moving to the next column data bit in a given row. The row would then be repeated in the same fashion so as to provide a square of four data bits from a previous single data bit. This would a two power zoom of the image. Greater or lesser repetitions could be provided to provide a greater or lesser zoom capability.

BRIEF DESCRIPTION OF THE DRAWINGS

A better understanding of the method and apparatus for merging internally stored or generated video with external video and for processing resultant video for use in a projection display system, may be had by reference to the accompanying drawings in which.

BRIEF DESCRIPTION OF PREFERRED EMBODIMENTS

1. Combination of External and Internal Video Inputs

Figure 1:
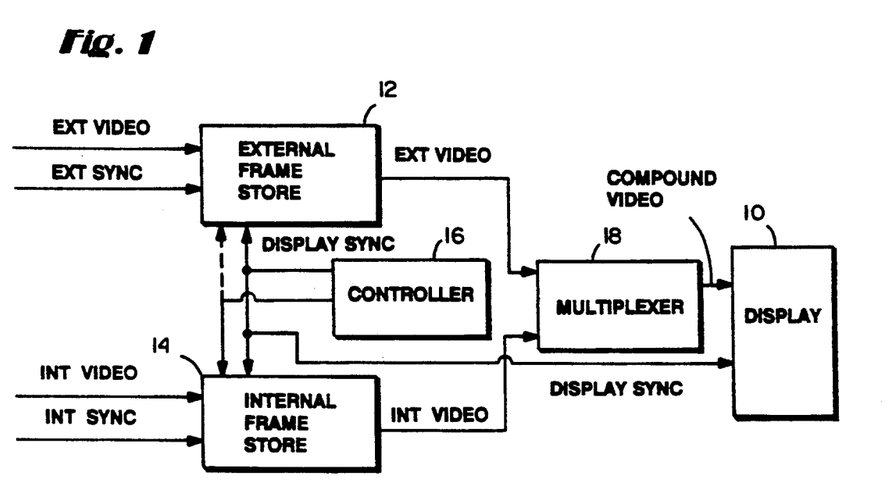
FIG. 1 is a block diagram illustrating the method and structure for merging external and internal video in accordance with the present invention.

In FIG. 1, a system for combining internal and externally supplied video is provided for running display 10 which, in a preferred embodiment, is a thin film transistor liquid crystal display (LCD) system. This display system can be of the direct view type (in which the display is back-lit) or it can be one of several different projection systems in which the display is placed upon an overhead projector or is incorporated into a projector system for projection upon a viewing screen. External video is applied to the system and if, initially analog, is converted into a digital format by a suitable analog/-digital converter. Although the term external video sync is used to describe the horizontal and vertical synchronization signal for the external video, this encompasses the usual case in which the horizontal and vertical synchronization signals are part of the analog or digital video as well as the situation in which they are physically or electrically separate signals.

The external video is supplied to external frame store 12. In a preferred embodiment, the external frame store is a dual port memory (data can be written into the memory in one port while data is read out of the memory by the other port). One example of a dual port memory is manufactured by Toshiba Electronics, Inc., Eastern Region, 25 Mall Rd. 5th Floor, Burlington, Mass., 01803,Part No. TC524256, CMOS Multiport Memory. Internally generated digital video is supplied to internal frame store 14 which can be a similar device. Alternatively, internal video can be generated from an internal microprocessor (not shown) or read from a mass storage device by an internal microprocessor (not shown).

Controller 16 provides a display sync signal which synchronizes the reading out of video stored in the frame stores as well as operation of display 10. The display sync signal serves to synchronize both frame stores with each other and with display 10. Controller 16 also provides an address which causes data stored in the external frame store 12 to be read out as external video and data stored in the internal frame store at the address to be read out as internal video. It should be noted that although substantially different data may be contained in the external and internal video outputs from the external and internal frame stores respectively, each video bit output is caused by providing the same address input to both the external and internal frame stores.

A separate output is indicated from controller 16 to preferably internal frame store 14 but alternatively (by means of phantom line arrow) to external frame store 12. This additional controller output is actually a portion of the display sync signal itself and serves to indicate to multiplexer 18 whether external video input or internal video input to the multiplexer is to be provided as an output to the display 10. Therefore, depending upon whether external video or internal video is enabled, each pixel of display 10 will receive the chosen external video or internal video bit. Thus, the output from multiplexer 18 is labelled compound video although this is meant to indicate video which can be either external or internal although it generally is not a combination of both.

While some embodiments of the FIG. 1 device might utilize the fourth bit of a four bit data word output from internal video store to indicate to multiplexer 18 whether internal or external video is to be selected, this would prevent a four bit data word from representing any more than seven separate colors because the eighth through fifteenth colors would involve operation of the fourth bit, thereby precluding its use from indicating more than seven separate colors. However, because a four bit data word can indicate fifteen different colors with the number 15 being decoded by the multiplexer to indicate that the external video is to be selected (in the case the internal video is the video controlled by controller 16). Thus, twice as many colors can be included with video data as long as multiplexer 18 includes a decoder for decoding the number which indicates which of the internal or external videos is to be supplied to the display at the pixel.

In accordance with the above, it can be seen that with control any combination or variation of internal video signals can be provided to display 10. Regardless of the clock rate at which external and/or internal video is stored in the dual port memories, the data word at each pixel is simultaneously clocked out of the external and internal store and sent to the multiplexer where the appropriate video (external or internal) is selected for the display pixel which has been addressed by the controller 16. The characteristic of the dual port memory permits information to be read into the memory simultaneously with information being read out of the memory at differing clock rates. Thus, appropriate "windows", "split screen" and other video techniques can be applied by controller 16 and its synchronous addressing of the external and internal frame stores 12 and 14, respectively.

In a preferred embodiment, the internal frame store would be provided information at the display sync frequency such that internal frame store 14 would not have to be a separate dual port memory but indeed could be a single port memory which is periodically updated. Alternatively, internal frame store 14 could be an internal microprocessor video generator or a mass storage device which provides internal video output when clocked by the display sync signal from controller 16.

2. "Pan" and "Zoom" Video Control

Figure 2:
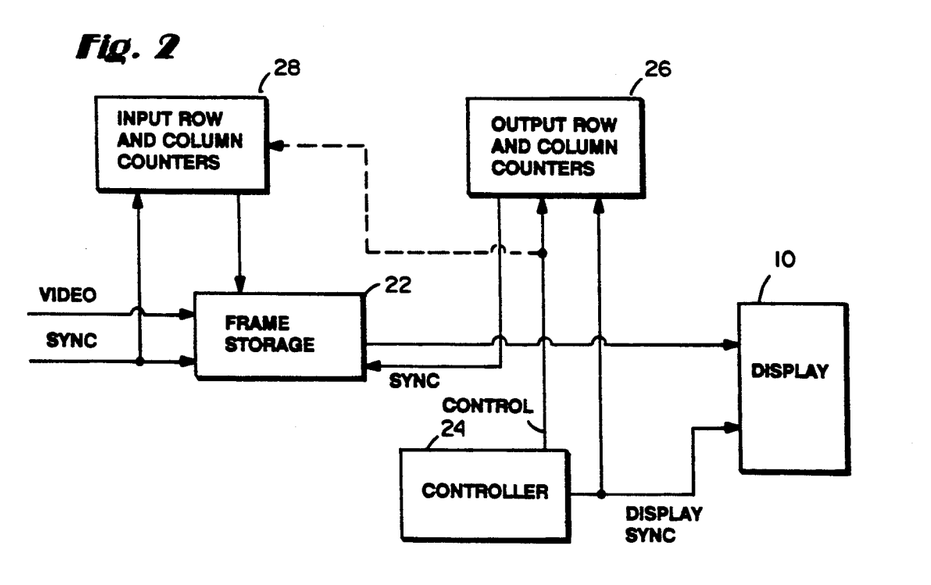
FIG. 2 is a block diagram illustrating the method and apparatus for providing "pan", "zoom" and "reverse image" special effects to displayed video in accordance with the present invention.

FIG. 2 is a block diagram illustrating the method and apparatus for "pan" and "zoom" image controls. "Pan" control is defined as beginning a video image at a point displaced either horizontally and/or vertically from the normal starting point of a video image. "Zoom" is defined as a displayed video image which is larger or magnified with respect to a conventional video image applied to a display. As used herein, "zoom" will generally mean enlargements of an existing image by a power of two, i.e., two power, four power, eight power, etc.

Video is supplied to a dual port frame storage 22 and the video can be either external or internal as previously discussed. Thus, frame storage 22 has, at various addresses located therein, data from the digital video input which may be continually updated if desired. Controller 24 provides a control signal to separate output row and column counters indicated generally as block 26. In order to "pan" so that the display image has a different horizontal and vertical reference from the video input, controller 24 sets the initial number in each row and column counter in the row and column counters 26 with the result that the counters then access the data at that address in frame storage 22 which is then read out to display 10.

Similarly, in order to "zoom", the controller 24 would cause the same column address in frame storage 22 to be read out twice before moving to the next column in a given row. Similarly, each row would be read out twice before going on to the next row. As a consequence, display 10 would display only one-fourth of the video contained in frame storage 22. As long as no "panning" was involved, display 10 would display the first half of the video data represented by the video data stored in the addresses of the first half of the rows and first half of the columns addressed by the row and column counters 26. However, the image at display 10 would be twice as large since each pixel in the frame store would actually be displayed four times (twice horizontally and twice vertically).

If it were desirable to both "pan" and "zoom", controller 24 would merely set the row and column counters to the predetermined address which was to be displayed (as in "panning" above) and then each column (and its adjacent column) would have its data repeated twice in a row and then each row would be repeated before moving on to the next subsequent row. Thus, by controlling the starting point of the rows and columns, a video input can be panned to examine a specific portion thereof. By zooming at that portion, a closer look may be had where the closer look can be two, four, eight or more times the image originally displayed.

While the "pan" and "zoom" embodiment is disclosed in which controller 24 resets the count in the separate row and column counters that provides the address of data to be read out of the frame storage 22, the controller could also change the input where video data is stored as it is read into frame storage 22 (and therefore controller 24 would control the input row and column counters 28). Accordingly, in the case of panning, the row and column counters would be incremented or decremented to the desired position for the beginning of the video to be read out so that as the frame storage 22 is accessed, there will be a horizontal and/or vertical difference between the video stored in the frame storage 22 and the video actually displayed on display 10.

In the event zooming is to be accomplished, video data input into the frame storage 22 would be stored at multiple addresses (in the case of a two power zoom, each input data bit would be stored at four separate addresses comprising two adjacent rows and two adjacent columns). Thus, when the stored video is read out in conventional fashion to the display, it would provide the same input video bit to four adjacent pixels on display 10, thus providing the two power zoomed image.

It is to be noted that with respect to both FIG. 1 and FIG. 2 embodiments, horizontal and vertical sync signals are provided by the controller 16 and 24, respectively, in order to maintain synchronism between video output from the storage devices and the display devices so as to provide a proper image.

3. Image Reversal

As previously noted, it is advantageous to be able to provide a "reverse" video output capability so that if display 10 is a rear-projection display system (as in the low stress work station discussed in U.S. Pat. Nos. 4,976,536 and 4,763,993 noted above) an appropriate video signal can be supplied. This image reversal is quite simply provided in the FIG. 2 embodiment by reversing the column count as video is stored in frame storage 22 or reversing the column count as in the output row is read out of the column counters 26 so that the video stored in the frame storage 22 is read out "backwards".

It is noted that in the preceding embodiment one would not generally reverse the "row" counters, although this could also be done if it were desirable to "flip" the image top to bottom in the event an additional optical transformation were being used. The above image reversal could be independent or combined with the pan and/or zoom capabilities as well. In a preferred embodiment, the input row in column counters 28 would have their column counters reversed and the output row in column counters 26 would be dedicated to "pan" and "zoom" special effects.

4. Combination of Preferred Embodiments

Figure 3:
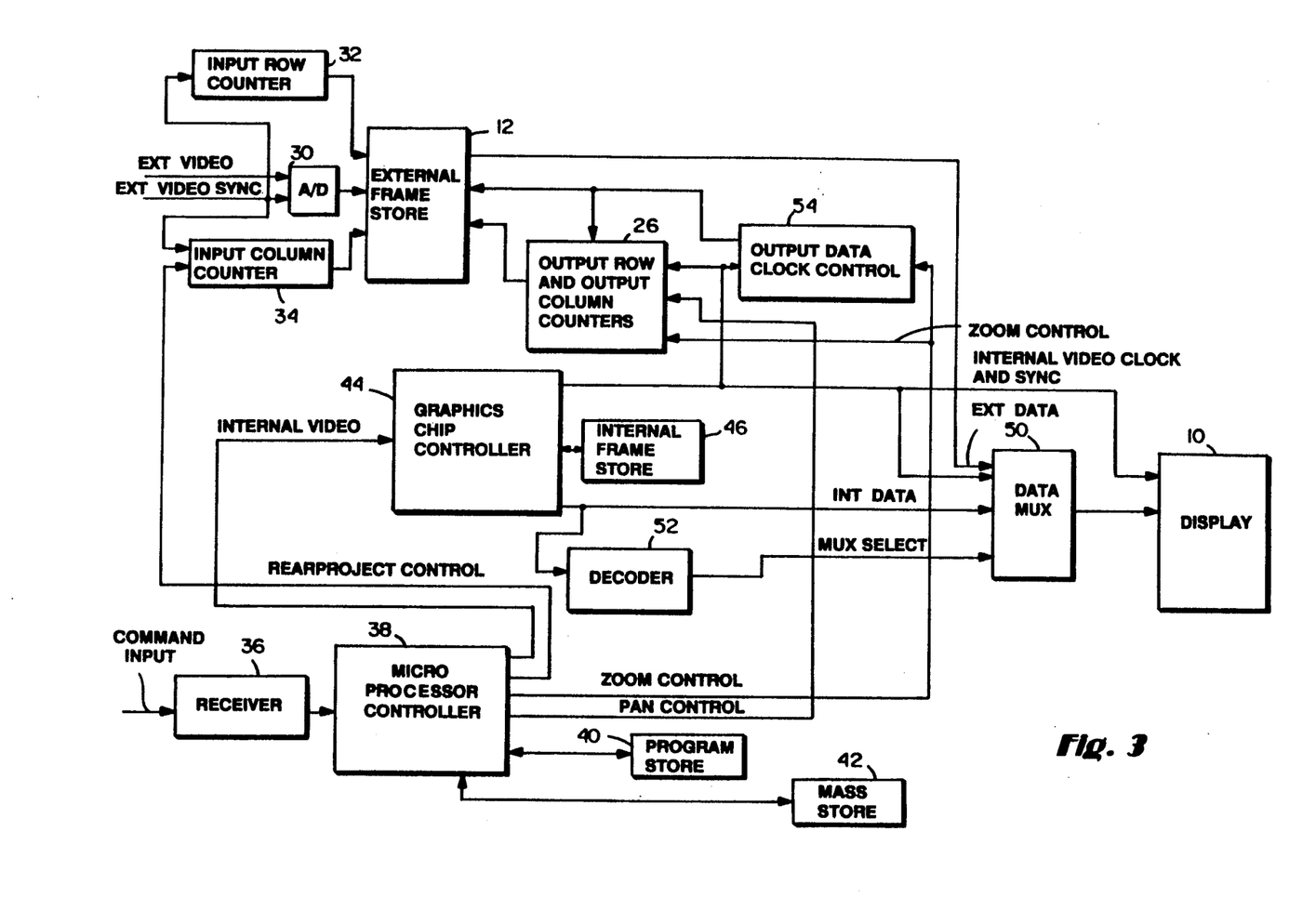
FIG. 3 is a block diagram illustrating a preferred embodiment of the present invention which combines all described functional capabilities.

FIG. 3 illustrates a block diagram of a preferred embodiment which accomplishes all three of the above embodiment discussed with respect to FIGS. 1 and 2.

As previously discussed, external video is applied to A to D converter 30, if necessary, to convert to digital form. The digital video information is applied to one port of the external frame memory storage 12. The external video sync is applied to an input row counter 32 which supplies an output to the external frame storage memory 12. The external video sync is also applied to an input column counter 34 which is normally set at zero in order to count up but if the "rear project" control line is enabled it will start at a preset high number and count down to permit "reverse" image projection as previously discussed.

The output of the input column counter 34 is also applied to the external frame store memory. Operator command inputs are provided to receiver 36 which causes microprocessor controller 38 to access programs store 40 in order to generate an internal video output or to access mass store 42 to generate a stored internal video output. The internal video from microprocessor 38 is supplied to graphics chip controller 44 which in a preferred embodiment is available from Oak Technology, Incorporated, 139 Kifer Court, Sunnyvale, Calif., 94086, Part No. OTI-067.

The graphics chip controller 44 is memory mapped into the microprocessor controller's memory space so that the microprocessor controller can transfer the internal video data to the graphics controller chip by performing simple memory "write" operations. This internal video data is stored through the graphics chip controller in the internal frame store memory 46. In the illustrated embodiment, as data is sent to the graphics chip controller, the microprocessor controller provides an embedded coding such as dedicating number fifteen on a four bit data word which serves to select (as discussed with reference to FIG. 1) on a pixel by pixel basis and in real time, the appropriate frame store (external frame store memory 12 or internal frame store memory 46) for display by the LCD display 10.

It is to be noted that the graphics chip controller provides internal data directly to the data multiplexer 50 and in a preferred embodiment each data includes an embedded code to enable data multiplexer to select external or internal data for display. An internal data output is also supplied to decoder 52 which supplies a multiplexer select input to the data multiplexer 50 instructing the multiplexer to select either internal data or external data because such data is simultaneously supplied to the data multiplexer 50.

The graphics chip controller also supplies a display sync output (identified in FIG. 3 as internal video clock and syncs) to the display 10, to the data multiplexer 50, to the output row and output column counters 26 and an output data clock control 54.

Microprocessor controller 38 provides a "pan" control signal to the output row and column counters 26 which operate in the manner discussed with reference to FIG. 2. Microprocessor controller 38 also provides a zoom control output which is also a separate input to the output row and column counter 26 as well as output data clock control 54 and operates in the same manner discussed with reference to FIG. 2. Output data clock control 54 serves to control the read-out of data from external frame store memory 12 at normal speed or at ½ or ¼ speed for 2x or 4x zoom, respectively, while at the same time clocks output row and column counters 26 to send addresses to external frame store 12.

As noted above, the dual port memory utilized as the external frame store 12 provides for independent port clocks. This allows the external video to be reclocked at the internal video clock rate for the LCD display in a preferred embodiment. This LCD clock rate is fully controllable and is independent of the external clock, i.e., the external video sync. As discussed above, this permits a high degree of flexibility in terms of utilization of input signals as well as panel drive.

The internal and external videos may be reversed independently to support rear projection, although typically both images would be reversed together. The external video is reversed as noted above as it is stored in the frame store by reversing the count direction for the input column address counter 34. This loadable up/down counter serves as a storage pointer for the frame store and the count can be reversed by changing the control line from low to high, i.e., the "rear project" control from microprocessor controller 38. A typical counter could be obtained from Texas Instruments, Incorporated, P.O. Box 655012, Dallas, Tex. 75265, Part No. 74LS169.

The internal video can be reversed by the microprocessor controller 38 as it is stored through graphics chip controller 44 into the internal frame store 46. When using character generated graphics by means of program store 40, the reversal is done by redefining the graphics controller's character generator lookup table. This permits fast and easy screen control even when the display is backwards.

The independent panning and zooming of the two videos is as follows. For the external video system, panning and zooming are performed preferably as data is read from the external video frame store 12. Zooming, as discussed above, is achieved by adjusting the output data clock 54 and by manipulating the output memory row address counter in output row and column counters 26. When blowing the image up by a factor of 2, output data clock 54 would be slowed up to one-half its non-zoom frequency. Since data would now be coming out of the external frame store 12 at one-half the non-zooming frequency, data which had taken up one pixel on the panel previously would now take up a space two pixels wide. Data is made twice as tall on the LCD panel by incrementing the output row counter at one-half the frequency so that each row of data is sent to the panel twice. The horizontal and vertical sync signals from the graphics chip controller 44 ensure that the data is properly applied to the LCD display.

Panning of the external video system is achieved by adjusting the initial address loaded into the output column counter 26 in the external frame store 12 and by adjusting the output row and column address counters in the output row and column counters 26. The output row and column counters 26 have a loadable counter such as is available from Texas Instruments, Incorporated, Part No. 74LS163, which can be programmed to start from any count. In order to move the image ten pixels to the left and five pixels up the initial column address in the output row and column address counters 26 would be ten greater than it had been before and the start count of its output row of address counter would be five greater than it had been before.

For the internal video system, panning and zooming are performed directly by the microprocessor prior to being stored in the internal frame store 46 thus simplifying operation.

In accordance with the above, many modifications and adaptations of the present invention will be readily obvious to those of ordinary skill in the art. Different microprocessors, controllers, program store, mass store, graphics chip controllers, internal and external frame stores, counters, data multiplexers and displays could be utilized. Those of ordinary skill in the art will recognize that the interrelationship of these elements could be modified as previously suggested with respect to FIGS. 1 and 2 without departing from the spirit of the present invention.

Therefore, while the present specification is by way of example only and describes preferred embodiments of the present invention, the invention is not so limited and is only limited by the claims appended hereto.

What is claimed is:

1. A method of mixing independently generated internal video with at least one external video to provide a compound video signal to a display device, where said at least one external video is supplied with an external sync signal and said internal video comprises one of a stored video read out of storage with an internal video sync signal and an internally generated video provided with an internal video sync signal, said method is capable of synchronous and asynchronous operation and comprising the steps of:

clicking said at least one external video into at least one dual port external frame storage by means of said external sync signal;

clocking said internal video into an internal frame store memory;

clocking said at least one external video out of said at least one dual port external frame storage and into a data multiplexer by means of a display sync signal;

clocking said internal video out of said internal frame store memory and into said data multiplexer by means of said display sync signal;

controlling said data multiplexer so as to choose and pass desired portions of said internal video and said at least one external video forming a compound video signal provided to said display device by means of said display sync signal.

2. A method of mixing independently generated internal video with external video in accordance with claim 1, wherein said display sync signal is asynchronous with respect to one of said external sync signal and said internal vide sync signal.

3. A method of mixing independently generated internal video with external video in accordance with claim 1, wherein said display sync signal is synchronous with respect to one of said external sync signal and said internal video sync signal.

4. A method of mixing independently generated internal video in accordance with claim 1, wherein said at least one external video comprises a single external video, and said first and third steps of clocking of said at least one external video comprise steps of clocking said single external video, and said data multiplexer controlling step comprises the step of controlling the data multiplexer so as to pass desired portions of said internal video and said single external video.

5. An apparatus for mixing independently generated internal video in accordance with claim 1, wherein said at least one external video comprises a single eternal video, said at least one external sync signal comprises a single external sync signal, said at least one external dual port frame store memory comprises a single external dual port memory, said external sync signal means comprises a means for clocking said single external video into said single external dual port frame store memory and said display sync signal means comprises a means for clocking external video out of said single dual port frame store memory.

6. A method of processing a digital video signal to provide a "pan" and "zoom" capability for video signals supplied to an LCD display device, where said digital video is supplied with a video sync signal, said method comprising the steps of:

clocking said digital video into a dual port frame storage by means of said video sync signal at predetermined row and column address locations, where said predetermined row and column address locations are related to rows and columns of said display device; and clocking said video out of said frame storage and into said display by means of a display sync signal, said display sync signal asynchronous with respect to said video sync signal, and a row and column counter, where said row and column counter is controlled by a controller which establishes a beginning row and column address dependent upon the portion of the digital video to which the display device is to be "panned" and which repeats each address a predetermined number of times for a respective row and column, until the end of a respective row and column of the display device is reached, said predetermined number of times dependent upon the amount of "zoom" desired.

7. A method of processing a digital video signal to provide a reverse or "mirror" image capability for video signals supplied to a display device, where said digital video is supplied with a video sync signal, said method comprising the steps of:

clocking complete lines of said digital video into a dual port frame storage by means of said video sync signal at row address locations related to rows of said display device and at column address locations related to one of (a) a reverse of address locations related to column locations of said display device and (b) column locations of said display device;

setting a beginning row and column address in an output row and column counter means, where a beginning row address is related to a beginning row on said display device and a beginning column address is related to the other of said (a) reverse of locations related to column locations on said display device and (b) column locations on said display device; and clocking complete lines of said stored digital video out of said dual port frame storage and into said display device.

8. A method of processing a digital video signal in accordance with claim 3, wherein said first clocking step comprises the step of clocking complete lines of said digital vide into said dual port frame storage by means of said video sync signal at row address locations related to rows of said display device and at column address locations related to a reverse of address locations related to column locations of said display device.

9. A method of mixing independently generated internal digital video with external digital video to provide a compound video signal to a display device, including providing a "pan", "zoom" and reverse or "mirror" image capability for digital video signals supplied to a display device, where said external digital video is supplied with an external sync signal and said internal digital video comprises one of a stored video read out of storage with an internal video sync signal and an internally generated video provided with an internal video sync signal, said method comprising the steps of:

clocking, by means of said external sync signal, said external digital video into a dual port external frame storage at predetermined row and column address locations where said predetermined row and column address locations are related to rows and columns of said display device, said row address locations related to rows of said display device and said column address locations are related to one of a reverse of address locations related to column locations of said display device and (b) column locations of said display device;

clocking said internal digital video into an internal frame store memory;

determining whether a reverse image is required and, if so, setting a beginning row and column address in an output row ana column counter means, where a beginning row address is related to a beginning row on said display device and a beginning column address is related to the other of said (a) reverse of locations related to column locations of said display device and (b) column locations on said display device;

clocking said stored external video out of said external frame storage and into a data multiplexer by means of a display sync signal and a row and column counter, where said row and column counter is controlled by a controller which establishes a beginning row and column address in said display sync row and column counter dependent upon the portion of digital video to which the display device is to be "panned" and which repeats each address a predetermined number of times for each row and column, until the end of a respective row and column of the display device is reached, said predetermined number of times dependent upon the amount of "zoom" desired;

clocking said stored internal video out of said internal frame store memory and into said data multiplexer by means of said display sync signal; and controlling said data multiplexer so as to choose and pass desired portions of said stored internal video and said stored external video forming a compound video signal provided to said display device by means of said display sync signal.

10. An apparatus for mixing independently generated internal video with at least one external video to provide a compound video signal to a display device, where said at least one external video includes at least one external sync signal and said internal video comprises one of a stored video read out of storage with an internal video sync signal and an internally generated video provided with an internal video sync signal, said apparatus comprising:

at least one dual port external frame store memory;

external sync signal means for clocking said at least one external video into said at least one dual port external frame store memory;

internal frame store memory;

means for clocking said internal video into said internal frame store memory;

data multiplexer;

display sync signal means for stored external video out of said at least one dual port external frame store memory and for stored internal video out of said internal frame store memory and into said data multiplexer by means of a display sync signal, said data multiplexer comprising means, responsive to said display sync signal, for passing desired portions of said stored internal video and said stored external video thereby forming a compound video signal output to said display device.

11. The apparatus for mixing independently generated internal video with external video in accordance with claim 10, wherein said display sync signal means comprises a means for generating a display sync signal which is asynchronous with respect to one of said external sync signal and said internal video sync signal.

12. The apparatus for mixing independently generated internal video with external video in accordance with claim 10, wherein said display sync signal means comprises a means for generating a display sync signal which is synchronous with respect to one of said external sync signal and said internal video sync signal.

13. An apparatus for processing a digital video signal to provide a "pan" and "zoom" capability for video signals supplied to an LCD display device, where said digital video is supplied with a video sync signal, said apparatus comprising:

a dual port frame store;

sync signal means for clocking said digital video into said dual port frame store at row and column address locations, where said row and column address locations are related to rows and columns of said display device;

row and column counter means, responsive to a controller means, for clocking said digital video out of said frame store and into said display device; and said controller means comprising a means for generating a display sync signal asynchronous with respect to said video sync signal, said controller means including a means for setting a beginning row and column address for said row and column counter means, said beginning row and column address dependent upon a portion of said digital video to which the display device is to be "panned", said controller means including a means for repeating each row and column address a predetermined number of times until the end of a respective row and column of the display device is reached, said predetermined number of times dependent upon the amount of "zoom" desired.

14. An apparatus for processing a digital video signal to provide a reverse or "mirror" image capability for video signal supplied to a display device, where said digital video is supplied with a video sync signal, said apparatus comprising:

dual port frame storage means for storing digital video at row and column address locations;

input row and column counter means, responsive to said sync signal, for clocking complete lines of said digital video into said dual port frame storage means at row address locations related to rows of said display device and said column address locations related to one of (a) a reverse of locations related to column locations of said display device and (b) column locations of said display device;

output row and column counter means, responsive to a display sync signal and a controller means, for clocking complete lines of said digital video out of dual port frame storage means and into said display device; and controller means for setting a beginning row and column address in said output row and column counter means, where a beginning row address is related to a beginning row on said display device and a beginning column address is related to the other of said (a) reverse of locations related to column locations on said display device and (b) column locations on said display device.

15. An apparatus for processing a digital video signal in accordance with claim 14, wherein said input row and column counter means include means for clocking said digital video to column address locations related to a reverse of locations related to column locations of said display device and said controller means includes means for setting beginning row and column address in said output row and column counter means where a beginning column address is related to column locations on said display device.

16. An apparatus for mixing independently generated internal digital video with external digital video to provide a compound video signal to a display device and to provide a "pan", "zoom" and a "mirror" or reverse image capability to said compound video signal, where said external digital video includes an external sync signal and said internal digital video comprises one of a stored video read out of storage with an internal video sync signal and an internally generated video provided with an internal video sync signal, said apparatus comprising:

a dual port external frame store memory means for storing external digital video at row and column address locations;

input row and column counter means, responsive to said external sync signal, for clocking said external digital video into said dual port frame store memory means at row address locations related to rows of said display device and said column address locations related to one of (a) a reverse of locations related to column locations of said display device and (b) column locations of said display device;

internal frame store memory;

means for clocking said internal digital video into said internal frame store memory;

data multiplexer means, responsive to a display sync signal, for passing desired portions of stored internal digital video and stored external digital video thereby forming a compound video signal output to said display device;

output row and column counter means, responsive to a display sync signal and a controller means, for clocking said stored external digital video out of said external frame store memory means and into said data multiplexer means; and controller means for clocking said stored internal digital video out of said internal frame store memory and into said data multiplexer means by means of a display sync signal, said controller means including means for generating said display sync signal, said controller means including a means for setting a beginning row and column address for said output row and column counter means, said beginning row and column address dependent upon a portion of digital video to which the display device is to be "panned", said controller means including a means for repeating each row and column address a predetermined number of times until the end of a respective row and column of the display device is reached, said predetermined number of times dependent upon the amount of "zoom" desired, where said beginning row address is related to a beginning row on said display device and said beginning column address is related to the other of said (a) reverse of locations related to column locations on said display device and (b) column locations on said display device.

17. An apparatus for mixing independently generated internal digital video with external digital video to provide a compound video signal to a display device and to provide a "pan", "zoom" and a "mirror" or reverse image capability to said compound video signal, where said external digital video includes an external sync signal and said internal digital video comprises one of a stored video read out of storage with an internal video sync signal and an internally generated video provided with an internal video sync signal, said apparatus comprising:

an input row and column counter means, responsive to said external sync signal and a reverse image control signal, for generating row and column address outputs to a dual port external frame store memory means, said row address outputs related to rows of said display device and said column address outputs related to a reverse of locations related to column locations of said display device when said reverse image control signal is present and locations related to column locations of said display device when said reverse image control signal is not present;

a dual port external frame store memory means, responsive to said input row and column counter, for storing external digital video at said generated row and column address locations;

at least one of an internal digital video generator and an internal digital video mass storage means;

microprocessor controller means, responsive to an operator input, (a) for transmitting said reverse image control signal to said input row and column counter means, (b) for transmitting a "zoom" control output indicative of a desired amount of "zoom", (c) for accessing at least one of said internal digital video generator and internal digital video mass storage means and for providing an internal digital video output, said internal digital video output including an external/internal selection code, and (d) for setting a beginning row and column address for an output row and column counter means by means of a "pan" control signal, said beginning row and column address dependent upon a portion of said digital video to which the display device is to be "panned";

internal frame store memory means for storing digital internal video at row and column address locations related to rows and columns of said display device;

graphics chip controller means, responsive to said microprocessor controller means internal video output, (a) for supplying said internal video output to row and column address locations in said internal frame store memory means, (b) for reading out stored internal digital video from said internal frame storage means, and (c) for providing a display sync signal;

decoder means, responsive to said internal video output from said graphics chip controller means, for providing an external/internal digital video select signal;

data multiplexer means, responsive to (a) a display sync signal, (b) said external/internal digital video select signal, (c) said internal digital video from said graphics chip controller means, (d) said external digital video from said external frame store, for passing selected portions of said internal digital video and said external digital video to said display and said external video to said display device thereby forming a compound digital video signal output;

output row and column counter means, responsive to said display sync signal, a slowed sync signal, said "pan" control signal, and said "zoom" control signal, for setting row and column addresses for clocking said digital video out of said external clocking said digital video out of said external frame storage means and into said data multiplexer, where a beginning output row and column address is related to a beginning row and column address on said display device;

output data clock control means, responsive to said display sync signal and said "zoom" control signal, for providing a slowed sync signal to said output row and column counter means and to said external frame store memory means, said slowed sync signal slowed 1/x where x is an integer corresponding to a desired amount of "zoom", said output row and column counter means including means for advancing the count of row and column addresses by said slowed sync signal while reading out external digital video data from row and column address locations in said external frame store memory means synchronized with said display sync signal, until the end of a respective row and column of the display device is reached.

18. A method of mixing independently generated internal video with at least one external video to provide a compound video signal to a display device, where said at least one external video is supplied with at least one external sync signal and said internal video comprises one of a stored video read out of storage with an internal video sync signal and an internally generated video provided with an internal video sync signal, said method is capable of synchronous and asynchronous operation and comprising the steps of:

clocking said at least one external video into at least one dual port external frame storage by means of said external sync signal;

clocking said internal video into an internal frame store memory, said internal video clocking step including the step of embedding an at least one external/internal selection code in said internal video;

clocking said at least one stored external video out of said at least one dual port external frame storage and into a data multiplexer by means of a display sync signal;

clocking said stored internal video out of said internal frame store memory and into said data multiplexer by means of said display sync signal;

coding said stored internal video clocked out of said internal frame store memory to determine from the at least one external/internal selection code whether one of said at least one stored external video and stored internal video is to be displayed; and controlling said data multiplexer in response to said decoded at least one external/internal selection code so as to choose and pass desired portions of said at least one stored external video and said stored internal video forming a compound video signal provided to said display device by means of said display sync signal.

19. A method of mixing independently generated internal video in accordance with claim 18, wherein in each of said steps said at least one external video comprises a single external video, said embedding step includes the step of embedding a single external/internal selection code in said internal video, said decoding step comprises the step of decoding so as to determine from said single external/internal selection code whether one of said single external video and internal video is to be displayed, and said data multiplexer controlling step comprises the step of controlling the data multiplexer, in response to said single external/internal selection code, so as to pass desired portions of said internal video and said single external video.

20. An apparatus for mixing independently generated internal video with at least one external video to provide a compound video signal to a display device, where said at least one external video includes at least one external sync signal and said internal video comprises one of a stored video read out of storage with an internal vide sync signal and an internally generated video provided with an internal video sync signal, said apparatus comprising:

at least one dual port external frame store memory;

external sync signal means for clocking said at least one external video into said at least one dual port external frame store memory;

internal frame store memory;

means for clocking said internal video into said internal frame store memory, said internal video clocking means including means for embedding an at least one external/internal selection code in said internal video;

data multiplexer;

decoder means, responsive to said embedded at least one external/internal selection code, for providing an at least one external/internal select signal to said data multiplexer; and display sync signal means for clocking external video out of said at least one dual port external frame store memory and for clocking internal video out of said internal frame store memory and into said data multiplexer by means of a display sync signal, said data multiplexer comprising means, responsive to said display sync signal and said at least one external/internal select signal, for passing desired portions of selected external video and said internal video thereby forming a compound video signal output to said display device.

21. An apparatus for mixing independently generated internal video in accordance with claim 20, wherein said at least one external video comprises a single external video, said at least one external sync signal comprises a single external sync signal, said at least one external dual port frame store memory comprises a single external dual port frame store memory, said embedding means comprises a means for embedding a single external/internal selection code, said decoder means comprises means, responsive to said single external/internal selection code, for providing a single external/internal select signal to said data multiplexer, and said display sync signal means comprises a means for clocking external video out of said single dual port frame store memory.

* * * * *